(12) United States Patent
Geiser et al.

(10) Patent No.: US 8,827,241 B2
(45) Date of Patent: Sep. 9, 2014

(54) DOOR FOR SEALING AN OPENING

(75) Inventors: Friedrich Geiser, Nuziders (AT); Anton Neumeier, Mering (DE); Cedric Wagner, Schellenberg (LI)

(73) Assignee: VAT Holding AG, Haag (CH)

( * ) Notice: Subject to any disclaimer, the term of this patent is extended or adjusted under 35 U.S.C. 154(b) by 127 days.

(21) Appl. No.: 13/575,411

(22) PCT Filed: Jan. 18, 2011

(86) PCT No.: PCT/AT2011/000032
§ 371 (c)(1),
(2), (4) Date: Jul. 26, 2012

(87) PCT Pub. No.: WO2011/091455
PCT Pub. Date: Aug. 4, 2011

(65) Prior Publication Data
US 2012/0298899 A1 Nov. 29, 2012

(30) Foreign Application Priority Data

Jan. 29, 2010 (AT) .................................. A 118/2010

(51) Int. Cl.
*F16K 25/00* (2006.01)
*F16K 51/02* (2006.01)
*F16K 3/18* (2006.01)

(52) U.S. Cl.
CPC .................................... *F16K 51/02* (2013.01);
*F16K 3/188* (2013.01)
USPC ........................................................ 251/193

(58) Field of Classification Search
USPC .................. 251/193, 326, 201, 200
See application file for complete search history.

(56) References Cited

U.S. PATENT DOCUMENTS

| 5,016,856 | A | * | 5/1991 | Tartaglino | ........................ 251/61 |
| 6,056,266 | A | | 5/2000 | Blecha | |
| 6,095,741 | A | * | 8/2000 | Kroeker et al. | ............... 414/217 |

(Continued)

FOREIGN PATENT DOCUMENTS

| DE | 19633798 | 2/1998 |
| DE | 19746241 | 5/1999 |

(Continued)

*Primary Examiner* — John K Fristoe, Jr.
*Assistant Examiner* — Kevin E Lynn
(74) *Attorney, Agent, or Firm* — Volpe and Koenig, P.C.

(57) ABSTRACT

A door for sealing an opening (2) in a wall (3) of a vacuum chamber (4) relative to the atmosphere includes a sealing element (1), which is attached to at least one rod (9, 9', 9'') and which can be moved between an open position, in which the sealing element releases the opening (2), an intermediate position, in which the sealing element covers the opening (2) but is raised from a seat (7) surrounding the opening (2), and a closed position, in which the sealing element is pressed against the seat (7), a door body (10), which carries the at least one rod (9, 9', 9'') and the sealing element (1) and which can be tilted about a tilt axis (20) relative to the wall (3) in order to move the sealing element (1) between the intermediate position and the closed position, and at least one tilting actuator (25, 25', 26, 26'), which has an inner cavity (27) into which a compressed gas can be introduced in order to tilt the door element (10) about the tilt axis (20). At least one wall (39) of the tilting actuator (25, 25', 26, 26') bounding the inner cavity (27) is elastic and/or flexible at least over a section of the extent of the wall.

17 Claims, 10 Drawing Sheets

(56) References Cited

U.S. PATENT DOCUMENTS

| | | |
|---|---|---|
| 6,416,037 B1 | 7/2002 | Geiser |
| 6,471,181 B2 | 10/2002 | Duelli |
| 6,899,316 B2 | 5/2005 | Duelli |
| 6,916,009 B2 | 7/2005 | Blecha |
| 2007/0272888 A1 | 11/2007 | Tichy |
| 2007/0290157 A1 | 12/2007 | Schoen |

FOREIGN PATENT DOCUMENTS

| | | |
|---|---|---|
| DE | 102006009060 | 9/2006 |
| JP | 2005240883 | 9/2005 |
| JP | 2007107655 | 4/2007 |
| WO | 2004102055 | 11/2004 |
| WO | 2009070824 | 6/2009 |

\* cited by examiner

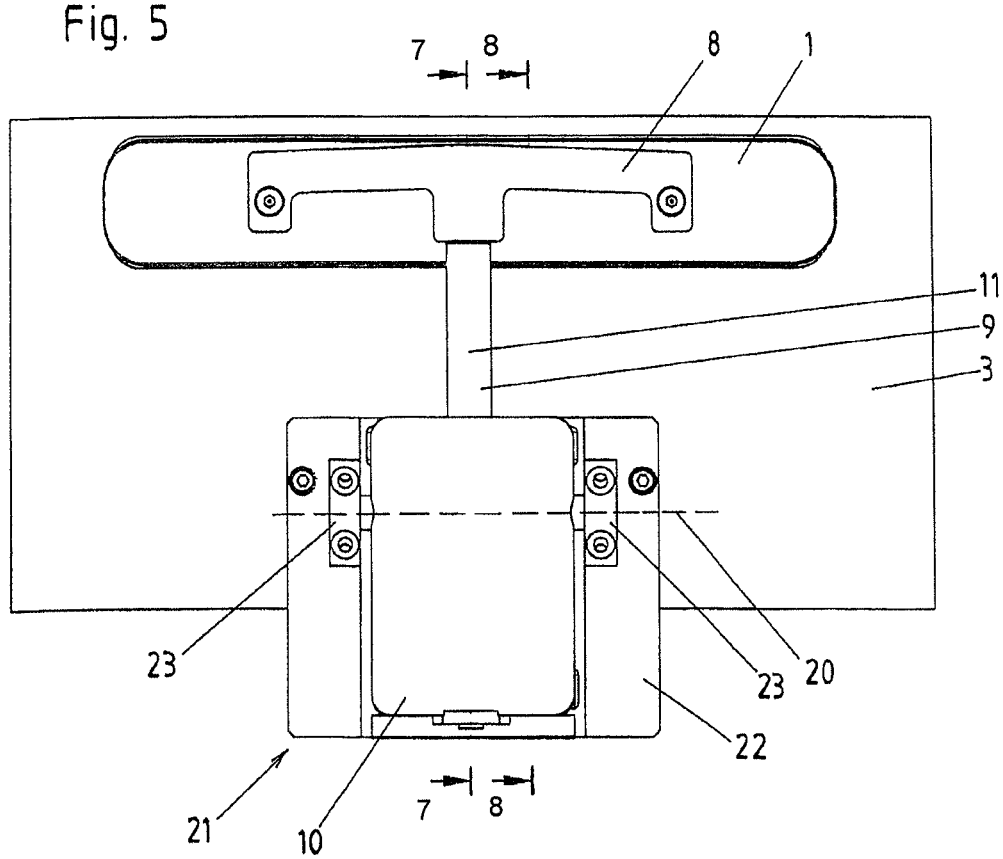
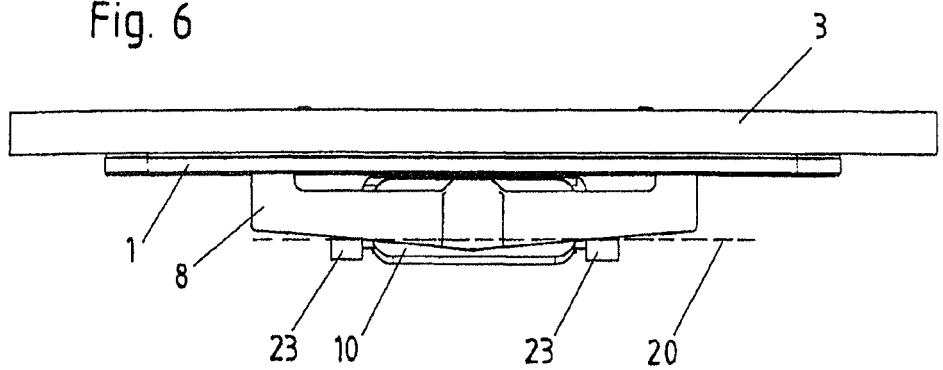

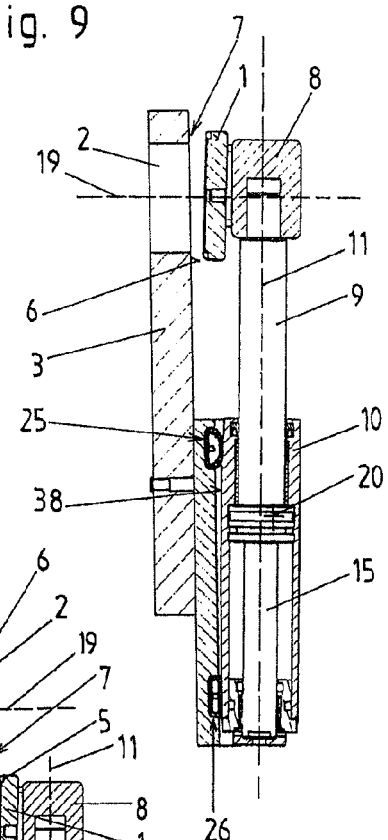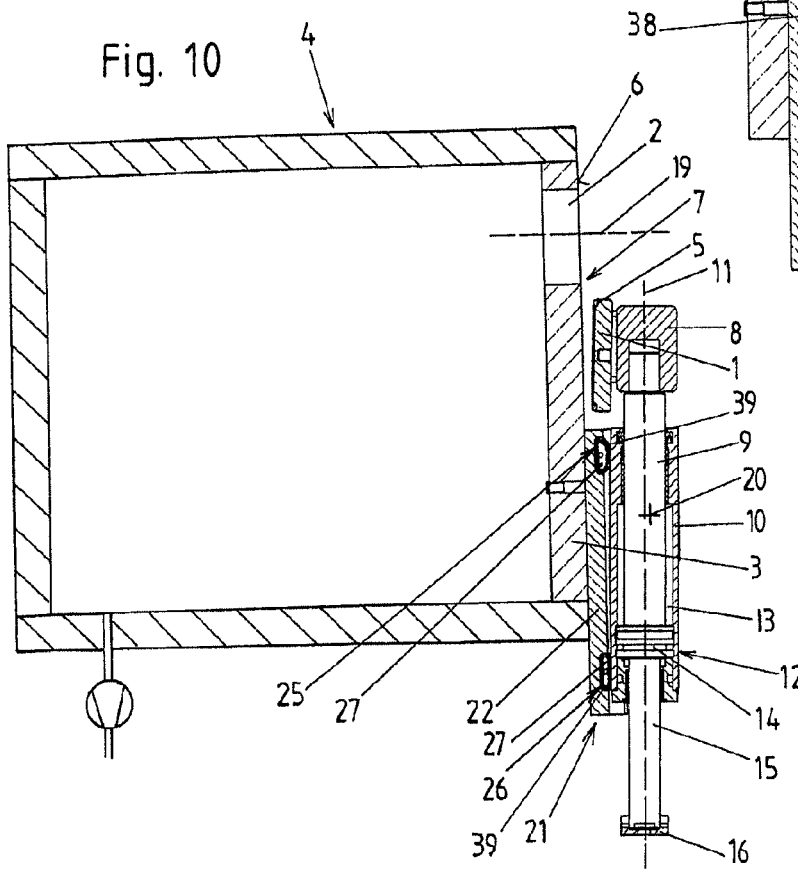

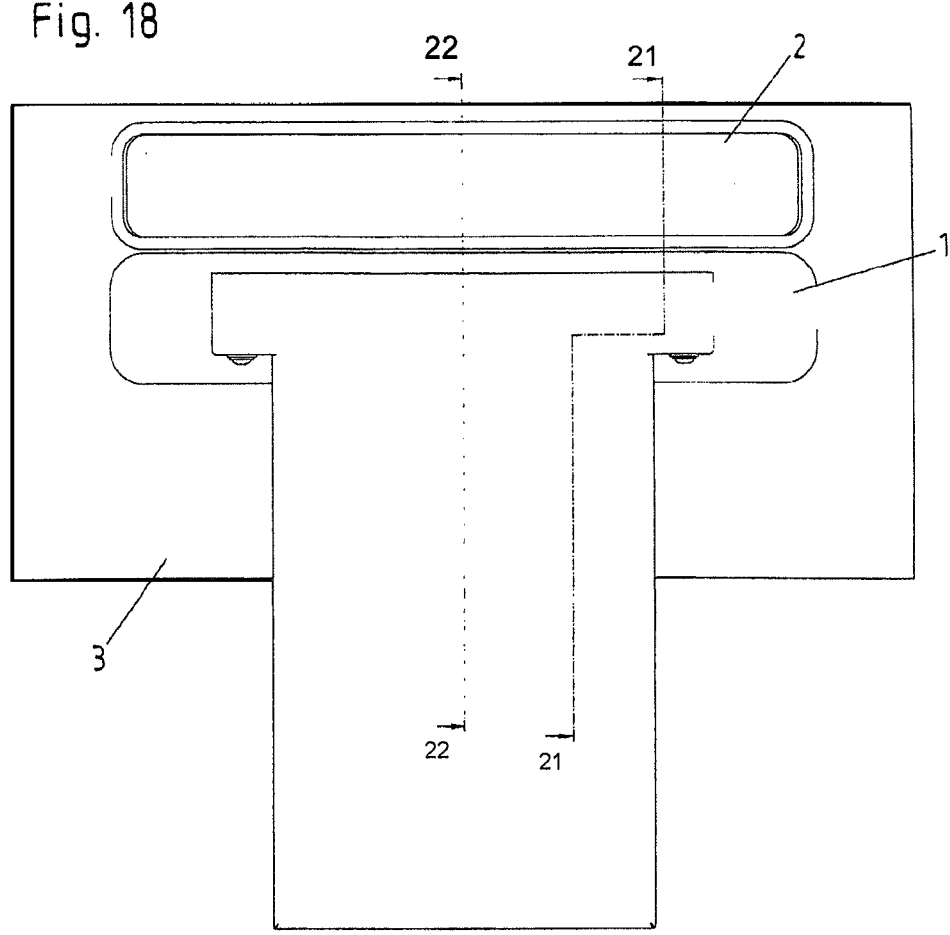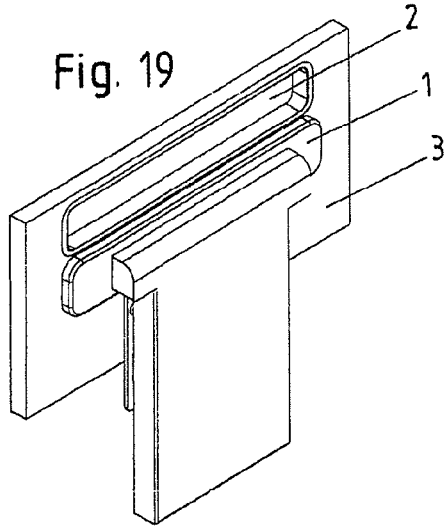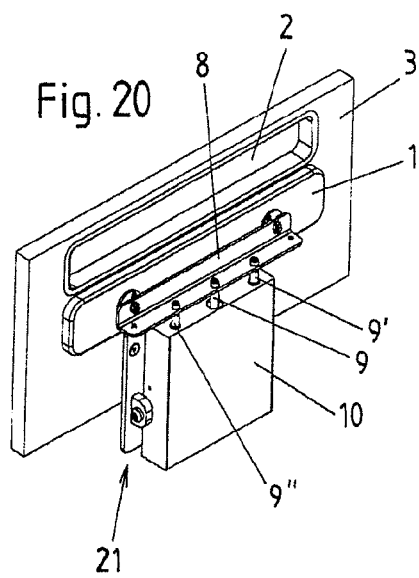

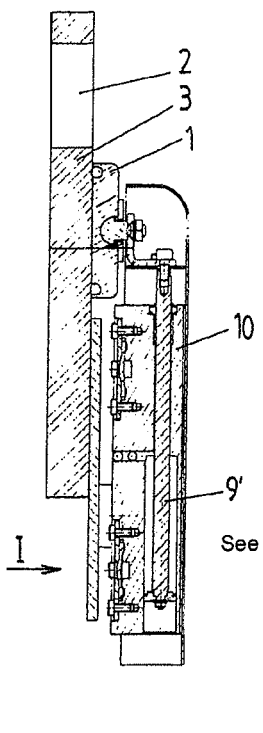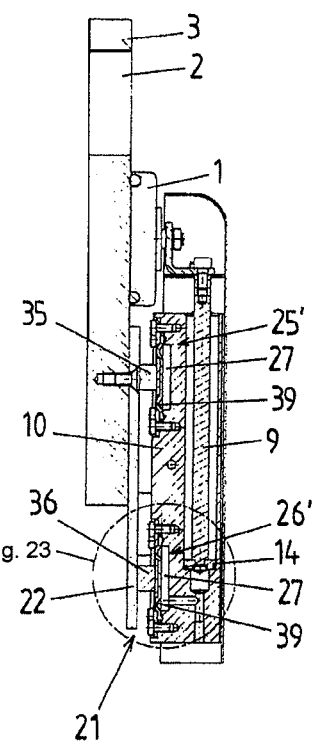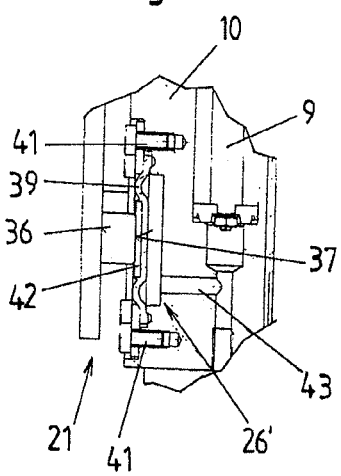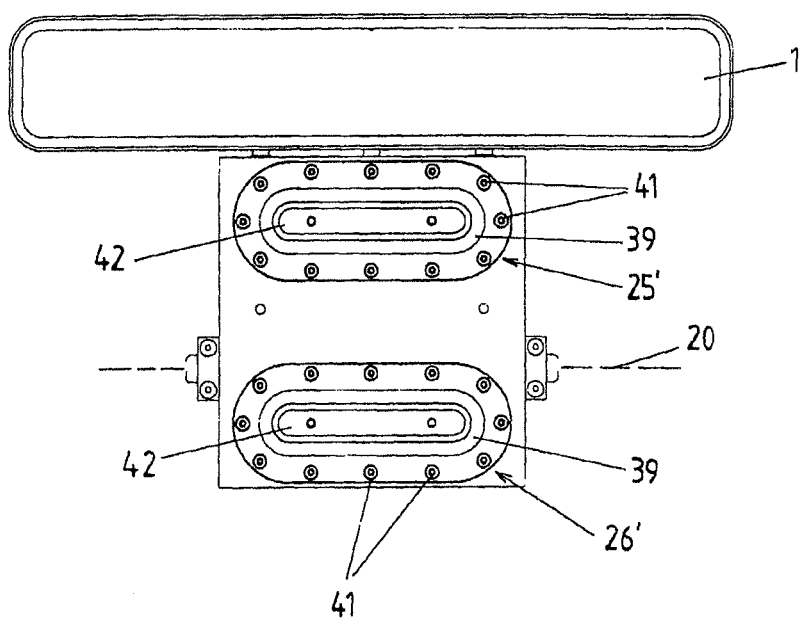

DOOR FOR SEALING AN OPENING

BACKGROUND

The invention relates to a door for closing an opening in a chamber wall of a vacuum chamber in reference to the atmosphere comprising a sealing element, which is fastened to at least one rod and which is adjustable between an open position, in which it releases the opening, an intermediate position, in which it covers the opening but raised from a seat surrounding the opening, and a closed position, in which it is pressed to the seat, a door body carrying at least one rod and the sealing element, and which can be tilted about a tilting axis in order to adjust the sealing element between the intermediate position and the closed position in reference to the chamber wall, and at least one tilting actuator, which comprises an inner cavity, into which a compressed gas can be introduced to tilt the door body about the tilting axis.

Doors are known in various embodiment for sealing openings in vacuum chambers. Such doors serve for example to allow the insertion work pieces into a lock bay and/or load-lock chamber, from which the work pieces after evacuation of the chamber are transferred into different chambers in which processing steps are performed under vacuum conditions.

A vacuum door is known for example from U.S. Pat. No. 6,056,266. In order to press the sealing element against the seat surrounding the opening, based on a retracted open position of the sealing element, in which it completely releases the opening, an L-shaped motion is performed. Here, in a first section of the adjustment path traveled, the sealing element is displaced via a first drive parallel in reference to the opening and/or the seat until the sealing element covers the opening but is still spaced apart from the seat. In a second adjustment path the sealing element is pressed via a second drive perpendicular in reference to the plane of the opening and/or the seat until the sealing element is pressed against the seat and the opening is sealed in a vacuum-tight fashion by the seal pressing against the sealing surface. The first and second drives are formed by piston-cylinder units. In order to form a subsequent control for the correct L-motion of the sealing element the piston surfaces of the piston-cylinder units acting in the opening and the closing direction are of different size. The piston surface acting in the closing direction is permanently impinged with the system pressure of the compressed air driving the piston-cylinder units. When the door is to be closed, starting from its open position, the piston surfaces of the first and second drive acting in the opening direction are rendered free from pressure, i.e. the respective cylinder chambers are evacuated. When the door is to be opened, starting from its closed state, the piston surfaces acting in the opening direction are impinged with the system pressure of the compressed air. Only a single switching valve is required for the correct performance of the L-motion during the opening and closing process of the door.

Additional vacuum doors, in which the sealing element performs a L-shaped motion during the opening and closing process of the vacuum door, are known from U.S. Pat. No. 6,899,316 B2, US 2007/0272888 A1, and U.S. Pat. No. 6,916,009 B2.

From DE 196 33 798 A1 a vacuum door of the type mentioned at the outset is known, in which the displacement along the first section of the displacement path also occurs in the above-described manner. In order to press the sealing element to the seat, beginning from a position covering the opening but separated from the seat, here the door body of the door is guided in a displaceable fashion by rods with the sealing element fastened thereon and can be tilted in reference to the chamber wall of the vacuum chamber comprising the opening. Via piston-cylinder units the door body is tilted about the tilting axis in order to press the sealing element to the seat and to separate it therefrom. In order to completely open the door, the sealing element, separated from the seat, is pulled back by the rods being axially displaced by piston-cylinder units.

A vacuum valve is disclosed in WO 2009/070824 A1 in which also the use as a vacuum door is described. Here, the sealing element can also be arranged outside the vacuum chamber and provided to seal an opening in a chamber wall. The opening and closing of the sealing element occurs only via one drive (which may provide two piston-cylinder units as actuators), by which the rods to which the sealing element is fastened, can be axially displaced. Based on an open position, in which the sealing element completely releases the opening, the sealing element is first displaced parallel in reference to the plane of the opening and/or the seat surrounding the opening until the sealing element approaches the guiding elements arranged at both sides of the opening and comprising guiding surfaces extending at an angle in reference to the plane of the seat. By these guiding surfaces the sealing element is displaced via an end section of the displacement path prior to reaching its sealed position at an angle in reference to the plane of the seat until the sealing element is made to contact the seat and the seal is pressed against the sealing surface.

From U.S. Pat. No. 6,471,181 B2 a fastening of a valve plate is known at a valve rod, in which the valve plate can be tilted about an axis aligned perpendicular in reference to the axis of the valve rod.

A vacuum valve is discernible from US 2007/0290157 A1 in which a sealing element comprises a valve plate for sealing the valve opening. Inside the sealing element a setting piston is arranged, with tappets being fastened thereon, which are supported on the valve housing for pressing of the valve seat against the valve plate. At least one operating chamber of the sealing element, which can be impinged with compressed gas to displace the setting piston, is limited by a diaphragm seal.

SUMMARY

The objective of the invention is to provide a vacuum door of the type mentioned at the outset which is embodied simply and cost-effectively.

This is attained with a door arrangement according to the invention.

In the door according to the invention at least one tilting actuator is provided for tilting the door body about the tilting axis, which comprises an inner cavity into which a compressed gas can be introduced. At least one wall of the tilting actuator limiting the inner cavity is first embodied elastically over sections and/or flexibly and is supported at a contact area of the door body and/or a contact area of the chamber wall or a fastening part held to the chamber wall. When injecting compressed gas into the inner cavity of the tilting actuator, the volume of the inner cavity increases, leading to the wall at least sectionally embodied from an elastic and/or flexible material to expand towards the contact area where it is supported, with consequentially the tilting actuator pivoting the door body about the tilting axis.

Such a tilting actuator overall can also be called the "inflatable element".

In an advantageous embodiment of the invention the inner cavity of the tilting actuator is entirely limited by an elastic and/or flexible wall. Advantageously such an inflatable element is embodied in the form of an inflatable tube.

Preferably, one tilting actuator each is arranged at the sides opposite the tilting axis, respectively comprising a wall elastic and/or flexible over at least a portion of its expansion, which limits the inner cavity of the tilting actuator at least over a part of its circumference and is supported on the contact area of the door body and/or on the contact area of the chamber wall or the fastening part held on the chamber wall. The tilting actuator located at one side of the tilting axis causes a tilting of the valve body into a pivotal direction with the closure element being displaced from its open position in an intermediate position and the tilting actuator located at the other side of the tilting axis causes a tilting of the door body about the tilting axis into the other pivotal direction, with the closure element being displaced from its intermediate position into its closed position. In general, it is also possible to perform the tilting in one of the tilting directions via a spring-elastic element.

An advantageous embodiment of the invention provides that the door body is supported in a tiltable fashion about the tilting axis at the fastening part, to be fastened to the chamber wall. Here, at least one tilting actuator may be held to the fastening part or to the door body.

In order to adjust the closure element between an open position and its intermediate position at least one rod, fastened to the closure element, is beneficially guided in the door body in an axially displaceable fashion and can be displaced by a rod drive, preferably at least one piston-cylinder unit, in the direction of its longitudinal axis.

BRIEF DESCRIPTION OF THE DRAWINGS

In the following, additional advantages and details of the invention are explained in greater detail based on the attached drawing. Here it shows:

FIGS. 5 and 6 are a front view and a top view in the closed position of the closure element;

FIG. 9 is a cross-sectional view according to FIG. 7 in the intermediate position of the closure element;

FIG. 10 is a cross-sectional view according to FIG. 7 in the open position of the closure element, with the other walls of the vacuum chamber being schematically indicated;

FIG. 18 is a front view of a third embodiment of a door according to the invention;

FIG. 19 is a perspective view of the door of FIG. 18;

FIG. 20 is a perspective view according to FIG. 19, with the cover for the door body being omitted;

FIG. 21 is a cross-sectional view along the line 21-21 of FIG. 18;

FIG. 22 is a cross-sectional view along the line 22-22 of FIG. 18;

FIG. 23 is an enlarged detail from FIG. 22, and

FIG. 24 is a front view of the door body with the closure element supported thereby and the bearing blocks in a front view in the viewing direction I of FIG. 21.

DETAILED DESCRIPTION OF THE PREFERRED EMBODIMENTS

Figure 1:
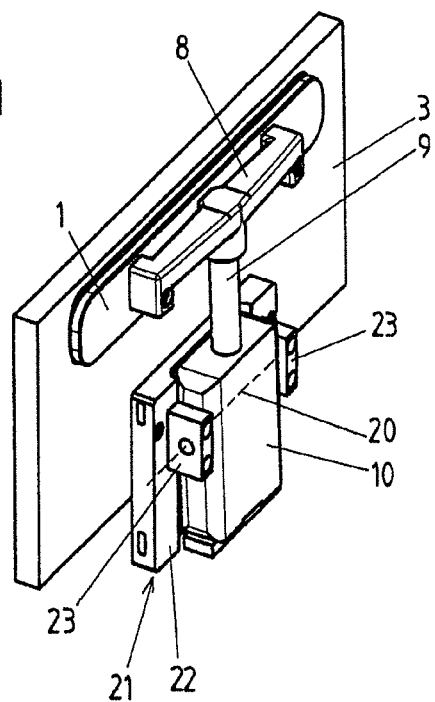
FIG. 1 is a perspective view of a door fastened at a chamber wall of a vacuum chamber having an opening according to the exemplary embodiment of the invention in the closed position of the closure element.
Figure 2:
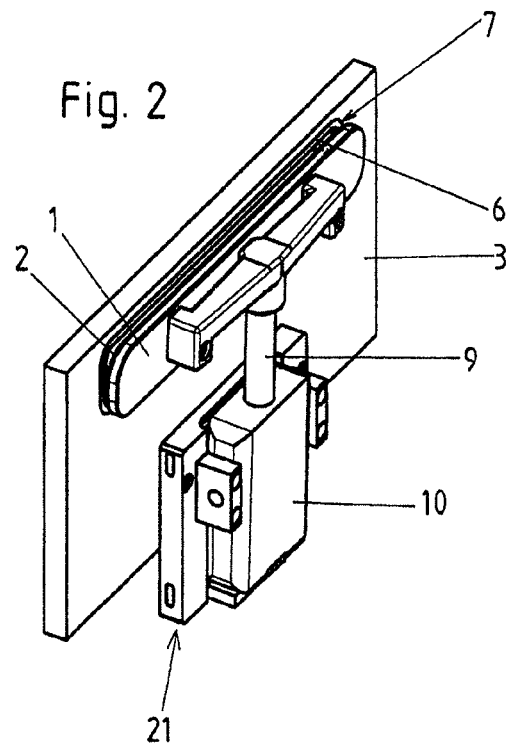
FIG. 2 is a perspective view according to FIG. 1 in the intermediate position of the closure element.
Figure 3:
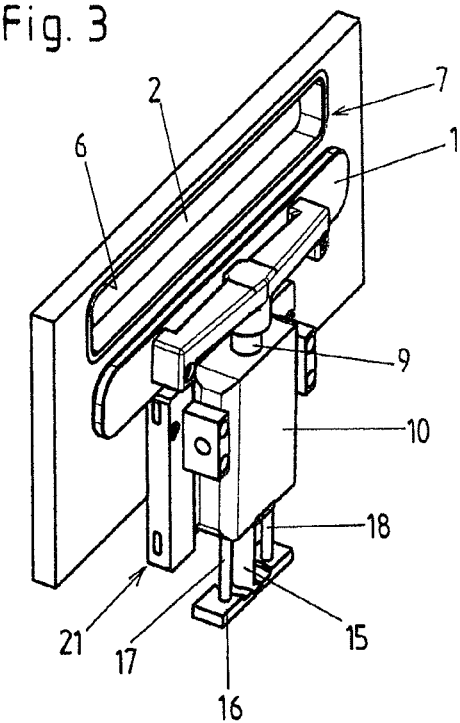
FIG. 3 is a perspective view according to FIG. 1 in the open position of the closure element.
Figure 4:
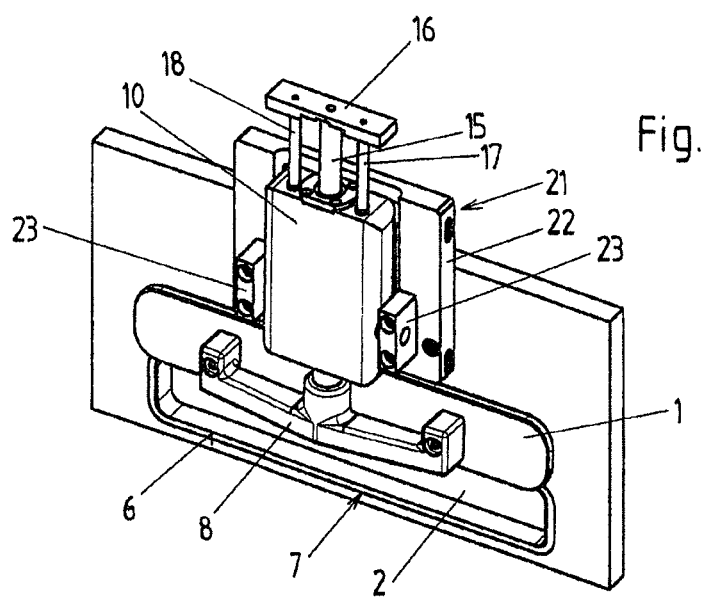
FIG. 4 is a perspective view in the open position of the closure element from a different point of view.
Figure 7:
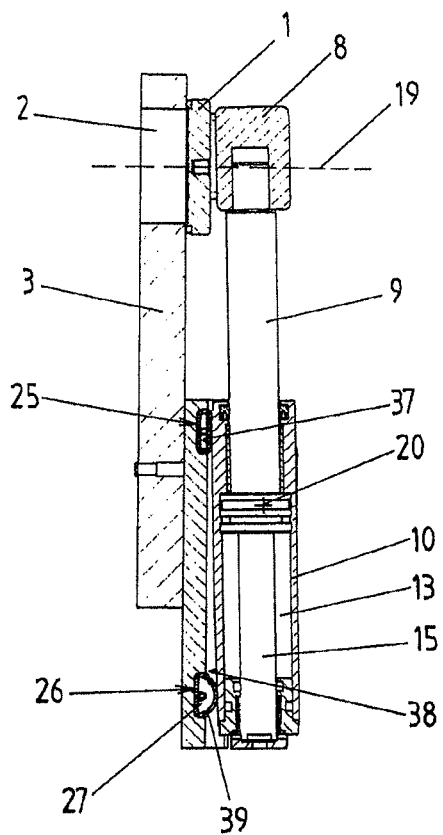
FIG. 7 is a cross-sectional view along the line 7-7 of FIG. 5.
Figure 8:
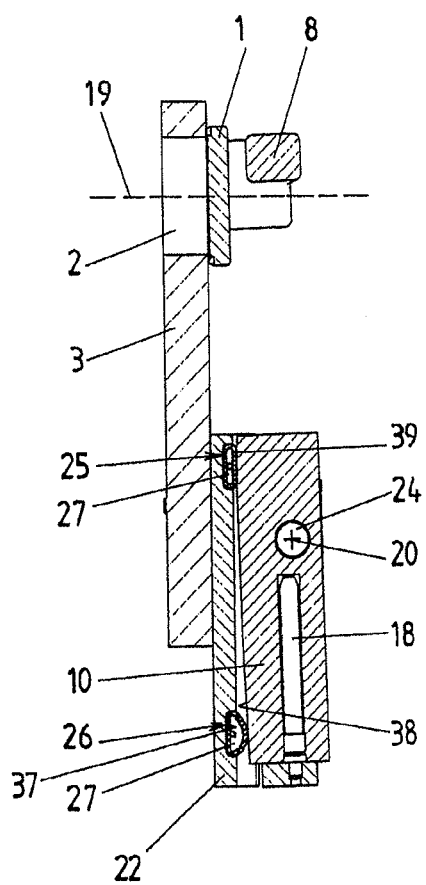
FIG. 8 is a cross-sectional view along the line 8-8 of FIG. 5.
Figure 11:
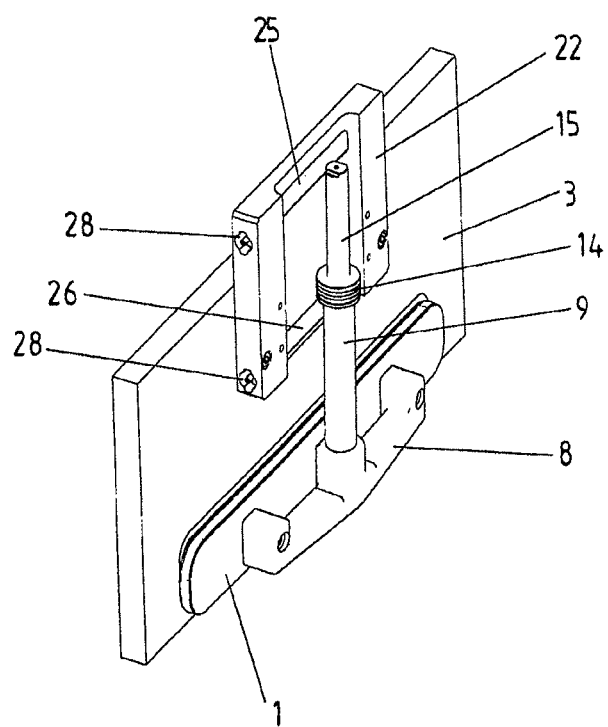
FIG. 11 is a perspective view in the closed position of the closure element, with the door body and the bearing blocks of the fastening part being removed.
Figure 12:
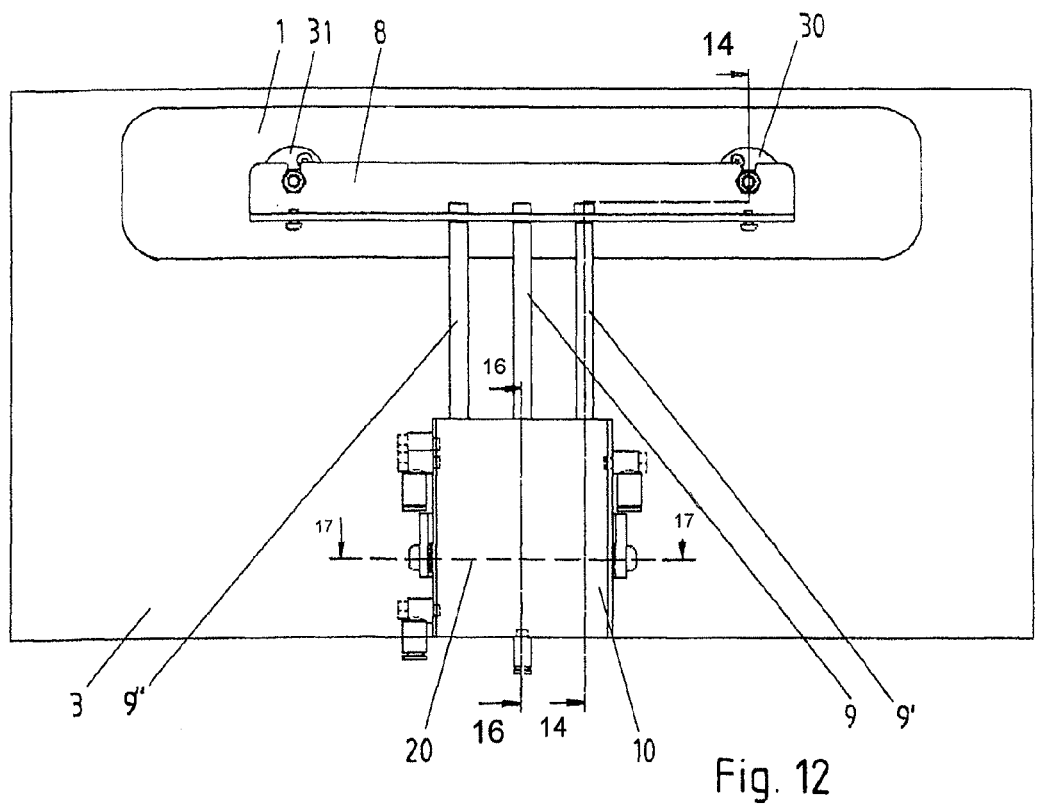
FIG. 12 is a front view of a second embodiment of a door according to the invention.
Figure 17:
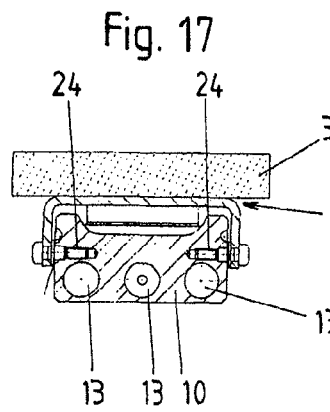
FIG. 17 is a cross-sectional view along the line 17-17 of FIG. 12.
Figure 13:
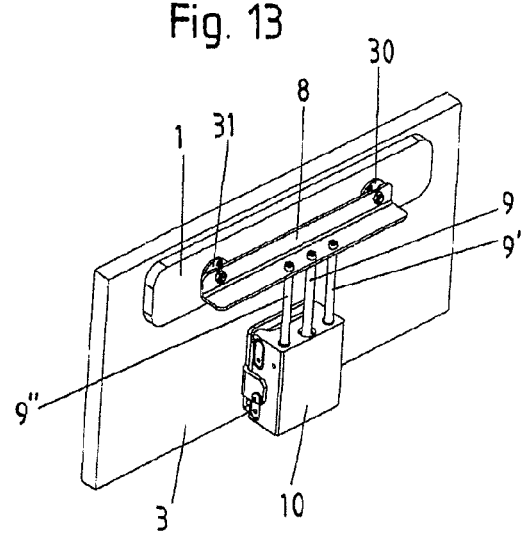
FIG. 13 is a perspective view of the door of FIG. 12, in which the connection sockets shown in FIG. 12 to supply compressed air are omitted for reasons of simplification.

An exemplary embodiment of a door according to the invention is shown in FIGS. 1 to 11. The door comprises a plate-shaped closure element 1, which in its closed position (cf. FIGS. 1 and 5-8) seals the opening 2 in a chamber wall 3 of a vacuum chamber 4. For this purpose, it comprises an annular seal 5, which is pressed against a sealing area 6 of the chamber wall 3. The seat 7 surrounding the opening 2, which the closure element 1 contacts in its closed position, is thereby formed in the exemplary embodiment shown by the sealing area 6. It is also possible to arrange the seal 5 on the seat 7 and the sealing area 6 on the closure element 1.

The closure element 1 is fastened via a connection part 8 to a rod 9. The rod 9 is guided in a door body 10 in a displaceable fashion in the direction of its longitudinal axis 11.

A rod drive 12 serves for the axial displacement of the rod 9 in the direction of its longitudinal axis 11, which is here embodied as a piston-cylinder unit 12. The piston-cylinder unit 12 is formed by a cylinder bore 13 embodied in the door body 10 and a piston 14 arranged therein, to which the rod 9 is fastened, which is guided out of said cylinder bore 13 in a sealed fashion. At the opposite side of the door body 10 a guiding rod 15, also fastened to the piston 14, is guided out of the cylinder bore 13 in a sealed fashion. At the end of the guiding rod 15, located outside the door body 10, a brace 16 is fastened, with anti-twist protection rods 17, 18 being arranged at both sides of the guiding rod 15, which are guided in a displaceable fashion in bores of the door body 10. This way, anti-twist protection is ensured for the rod 9 and thus for the closure element 1.

Anti-twist protection can also be embodied in a different fashion, for example by a non-circular embodiment of the rod 9 and/or the guiding rod 15 and a respective guidance in the door body 10. Furthermore, the closure element 1 may also be fastened to two or more rods 9 which are guided in a displaceable fashion in the door body 10 and each may be displaceable by a piston-cylinder unit or a joint piston-cylinder unit. In the latter case, they may be guided by the door body 10 and at their ends, located away from the closure element 1, may be connected by a brace which a piston rod of the piston-cylinder unit engages, preferably centrally between the two rods supporting the closure element 1.

The door body 10 supported by the chamber wall 3 is connected to the chamber wall 3 pivotally and/or tiltably about a tilting axis 20 aligned perpendicular in reference to the axis 19 of the opening 2 and/or parallel in reference to the plane of the seat 7, with it being arranged on the atmospheric side of the chamber wall 3, thus outside the vacuum area of the vacuum chamber 4.

In the exemplary embodiment shown, a fastening part 21 fastened to the chamber wall 3 serves for a pivotal support of the door body 10 in reference to the chamber wall 3, which supports the door body 10 about the tilting axis 20 in a tiltable fashion. For example, the fastening part 21 may here have bearing blocks screwed onto a support plate 23, which have axial bolts penetrating into bores in the door body 10 (such a bore and/or socket 24 is discernible in FIG. 8).

Tilting-actuators 25, 26 are held on the fastening part 21, embodied in the form of tubular inflatable elements. These tubular inflatable elements contact a contact area 37 of the fastening part 21 at the side facing the chamber wall 3 and a contact area 38 of the door body 10 at the side facing away from the chamber wall 3. In reference to the direction of the longitudinal axis 11 of the rod 9, one tilting actuator 25, 26 is arranged at both sides of the tilting axis 20.

By introducing compressed air into one of the two tilting actuators 25, 26, when the other tilting actuator 25, 26 is kept free from pressure (=connected to the atmosphere) the door body 10 is pivoted about the tilting axis 20 in one direction of rotation and by introducing compressed air into the other tilting actuator 25, 26, while the one tilting actuator 25, 26 is kept free from pressure, the door body 10 is tilted into the other direction of rotation. Another filling medium other than compressed air for the tilting actuators 25, 26 is principally possible, here, however compressed air is preferred.

The respective tilting actuators 25, 26 each comprise an inner cavity 27. When compressed air is introduced into the inner cavity 27 of the respective tilting actuator 25, 26 the volume of the inner cavity 27 increases, with the dimensions of the tilting actuator 25, 26 increase in reference to the direction of the axis 19 of the opening 2. When evacuating the compressed air the volume of the cavity 27 and/or the dimension of the respective tilting actuator 25, 26 reduce in the direction of the axis 19.

In this exemplary embodiment the inner cavity 27 of the respective tilting actuator 25, 26 is surrounded entirely and/or over its entire surface by an elastic wall 39, which expands when compressed air is inserted into the inner cavity 27.

The elastic wall 39 preferably comprises rubber-elastic material, for example Viton.

Instead of the embodiment of the wall 39 from an elastically expandable material an embodiment of the wall 39 from a flexible material is also possible. In order to tilt the door body 10, again compressed air can be injected from the inner cavity surrounded by the flexible wall (with its volume initially being close to zero), with first opposite wall sections contacting each other might be folded apart under an enlargement of the volume of the inner cavity 27. A combination of elastically expandable and flexible features of the material forming the wall 39 may also be utilized. Such a wall both elastically expandable as well as flexible may comprise Teflon, for example. The use of a rubber-elastic material, such as Viton, is here also possible.

A respectively inflatable tubular element is arranged with both of its ends in bores in the support plate 22, with it being closed at one end and at the other end comprises a socket 28 to connect to a compressed air line. The support plate 22 comprises a recess at its area between the two bores, in which the ends of the tubular inflatable element are arranged, through which the central area of the tubular inflatable element extends.

In the opened state of the door, in which the closure element 1 assumes an open position (cf. FIGS. 4 and 10) the inflatable element (=tilting actuator 25) located closer to the opening 2 in reference to the tilting axis 20 is inflated and the other inflatable element (=tilting actuator 26) is free from pressure. The closure element 1 is retracted from the opening 2 so that it is entirely released, e.g., seen in the direction of the axis 19 of the opening 2 does not overlap it. In order to close the door first the closure element 1 is displaced via the rod drive 12 from its open position into its intermediate position (cf. FIGS. 2 and 9) in which it covers the valve opening 2 in the direction of the axis 19, however is distanced from the seat 7. Subsequently the door body 10 is pivoted about the tilting axis 20, with the air being evacuated from the inflatable element (=tilting actuator 25) located closer to the opening 2 in reference to the tilting axis 20, i.e. this inflatable element is rendered free from pressure and/or connected to the atmosphere, while the inflatable element (=tilting actuator 26) further apart from the opening 2 in reference to the tilting axis 20 is inflated, thus pressurized. This way, the closure element 1 is made to contact the seat 7 with the elastic seal 5 being pressed against the sealing surface 6. The closure element 1 assumes a closed position and the door is in its closed state. The opening of the door occurs in the inverse manner.

The seal 5 may comprise a rubber-elastic material conventionally used for elastic vacuum seals, for example Viton. The seal 5 may be vulcanized at the closure element 1. An insertion into the groove arranged on the closure element 1 is also possible, with the seal 5 may particularly be embodied in the form of an O-ring.

In the closed state of the door the vacuum chamber 4 may be evacuated via a vacuum pump 29 shown schematically in FIG. 10 and a vacuum can be applied, here.

By the use of the inflatable elements as tilting actuators 25, 26 a simple and cost-effective embodiment is achieved. Due to the fact that a contact of metal to metal is avoided between the door body 10 and the fastening part 21 a low production of particles is achieved, which is desirable in many applications.

The connection part 8 may be embodied elastically so that an elastic tilting of the closure element 1 about a tilting axis is allowed, aligned perpendicular in reference to the longitudinal axis 11 of at least one rod 9 and parallel in reference to the plane of the seat 7. This way, an even compression of the seal 5 can also be achieved in a position of the closure element 1 not being precise in reference to this tilting axis. The ability of the closure element 1 to tilt in reference to at least one rod 9 may also be achieved differently, for example according to the prior art according to U.S. Pat. No. 6,471,181 B2 mentioned at the outset of the introduction to the description.

In particular in an embodiment in which the closure element 1 is mounted to two or more rods the rod drive may also have two or more actuators, e.g., piston-cylinder units, for example a separate piston-cylinder unit for each rod.

A second exemplary embodiment of the invention is shown in FIGS. 12 through 17. The same reference characters are used for parts analog the first exemplary embodiment. In the following, the differences to the first exemplary embodiment are described.

In this exemplary embodiment the closure element 1 is supported by three rods 9, 9', 9", by which it is moved from its open position via its intermediate position into its closed position and vice versa.

The rods 9, 9', 9" once more are displaceable in the direction of their longitudinal axes 11, arranged parallel in reference to each other. A rod drive 12 serves for the axial displacement, arranged in the area of the door body 10. The other ends of the rods are connected to the closure element 1. The connection occurs once more such that the plate-shaped closure element can pivot in reference to the longitudinal axis 11 of the rods 9, 9', 9" about an axis located perpendicular in reference to the longitudinal axis 11 and parallel to the central plane of the closure element 1. For this purpose, bearing parts 30, 31 are supported pivotally about this axis in reference to the closure element 1. For this purpose, the bearing parts have arc-shaped bearing areas 32, with their cross-section being perpendicular in reference to the central plane of the closure element 1, which cooperate with the respective arc-shaped bearing surface of the closure element 1. The bearing parts 30, 31 have a mushroom-shaped head comprising the bearing surfaces 32, located in a recess of the closure element 1, which includes the bearing surface 32. A cover plate 33, screwed to the closure element 1 and showing an opening, through which the neck of the respective bearing part 30, 31 passes, hinders the pulling out of the bearing part 30, 31 from the recess in the closure element 1. A ring 34 made from an elastic material is inserted between a stop between the head and the neck of the bearing part 30, 31 and the cover plate 33. The pivoting of the closure element 1 in reference to the bearing parts 30, 31 occurs towards this ring 34, which applies an elastic return force into a central position of the closure element 1.

For example, two bearing parts 30, 31 are provided, which are pivotal about the closure element 1 in the direction of the axis in reference to the bearing parts 30, 31, spaced apart from each other. A single bearing part or more than two bearing parts are possible.

A connection part 8 is fastened at the ends of the bearing parts 30, 31 projecting from the cover plate 33, at which additionally the rods 9, 9', 9" are fastened. For example, for this purpose the connection part is embodied as shown L-shaped in the cross-section, with the bearing parts 30, 31 being fastened at one of the two legs and the rods 9, 9', 9" at the other of the two legs.

The rod drive 12 comprises a separate actuator for each of the rods 9, 9', 9" embodied as a piston-cylinder unit. For example, for this purpose the door body 10 comprises a cylinder bore 13 in which one piston 14 is respectively arranged. Here, separate cylinders may also be provided held at the door body 10.

The pistons 14 are each embodied in a simply operating fashion, i.e. they act only in one direction parallel in reference to the longitudinal axis 11 of the respective rod 9, 9', 9". Here, for example the piston 14 cooperating with the central rod 9 acts in the closing direction, i.e. serves to displace the closure element 1 from its open position into it intermediate position, and the two pistons 14 cooperating with the lateral rods 9', 9" act in the opening direction, i.e. serve to displace the closure element from its intermediate position into its open position. The overall piston surface acting in the open direction (which is the sum of the piston surfaces of the piston 14 cooperating with the lateral rods 9', 9") is therefore larger than the piston surface acting in the closing direction (which is the piston surface of the piston 14 cooperating with the central rod 9)).

The tilting actuators 25, 26 may generally be embodied in the same manner as in the first exemplary embodiment, with here they are to be fastened at the door body 10, though. Here, the two ends of the tilting actuators embodied in the form of inflatable hoses are arranged in bores of the door body 10 and extend in a central area located between these two ends in a recess of the door body, with during the inflation they respectively contact the bottom of this recess forming a contact area 38 of the door body 10. For the tilting actuator 25 acting in the opening direction this central area extending through the recess is discernible in FIG. 13. The tilting actuators are also supported at the fastening part 21 mounted on the chamber wall 3, namely at the contact surfaces 37 of the support blocks 35, 36 of the fastening part 21.

A modification of this second exemplary embodiment is possible such that the tilting actuators 25, 26 are directly supported on the chamber wall 3. In this case the door body 10 could be embodied pivotal in reference to the chamber wall 3 by bearing parts fastened directly to the chamber wall 3 and a plate-shaped fastening part extending between the door body 10 and the chamber wall 3 could be omitted.

On the other hand, this exemplary embodiment could also be modified such that the tilting actuators 25, 26 are fixed to the fastening part 21.

Figure 14:
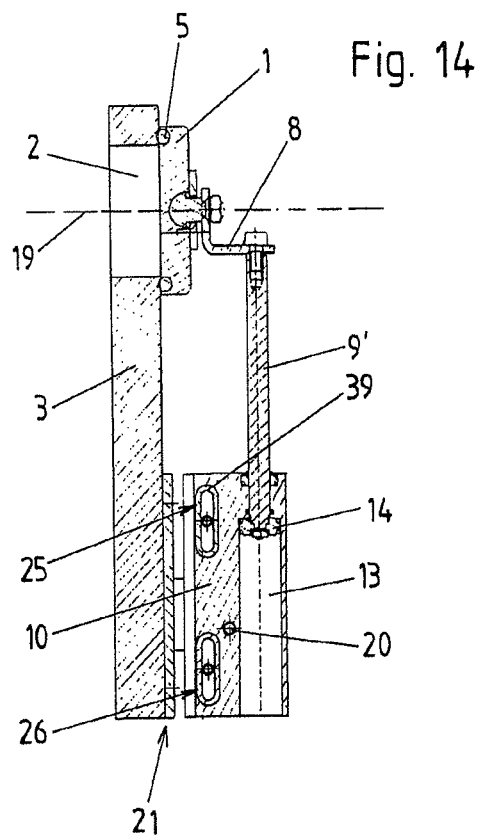
FIG. 14 is a cross-sectional view along the line 14-14 of FIG. 12.
Figure 15:
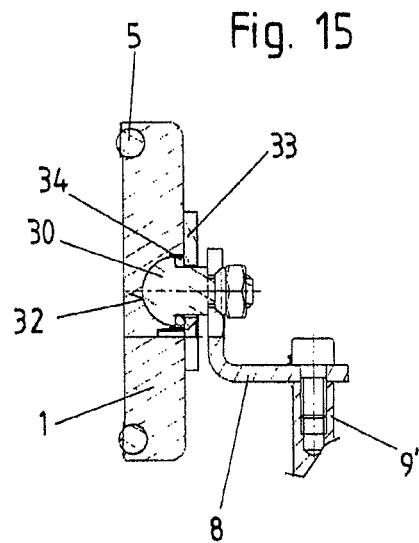
FIG. 15 is an enlarged detail of FIG. 14.
Figure 16:
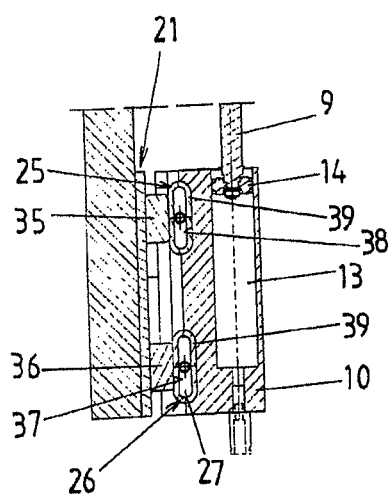
FIG. 16 is a cross-sectional view along the line 16-16 of FIG. 12.

The tilting axis 20 is located asymmetrically in reference to the two tiling actuators 25, 26, as particularly discernible from FIG. 14. The lever arms of the tilting actuator 25 acting in the opening direction (i.e. adjusting the closure element 1 from its closed position into its intermediate position) is here greater than the lever arm of the tilting actuator 26 acting in the closing direction (i.e. adjusting the closure element 1 from its intermediate position into its closed position).

Due to the different sizes of the piston surfaces in the opening and the closing direction and by the different torques of the tilting actuators 25, 26 about the tilting axis 20 in the opening and the closing direction a sequence control can be achieved in an easy fashion for the proper L-motion of the closure element 1 when opening and closing the door. Here, the piston surface acting in the closing direction and the tilting actuator 26 acting in the closing direction may be constantly impinged with the system pressure of the compressed air driving the actuators. When the door is to be closed, starting from its opened state, the piston surfaces acting in the opening direction and the tilting actuator 25 acting in the opening direction are set free from pressure, i.e. connected to atmospheric pressure. When the door is to be opened starting from its closed state the piston surfaces acting in the opening direction and the tilting actuator 25 acting in the opening direction are impinged with compressed air. Here, consequentially the correct L-motion of the closure element 1 develops, with overall only a single switching valve being required connecting a connection line supplying compressed air to the piston surface acting in the opening direction and the tilting actuator 25 acting in the opening direction with the system pressure of the compressed air or with atmospheric pressure. This sequence control is equivalent to the sequence control known from prior art of U.S. Pat. No. 6,056,266 mentioned in the introduction to the description.

Different piston surfaces acting in the opening and the closing direction are also possible in case of more or less than three actuators for the rod drive 12 and/or in case of dually acting pistons for the rod drive 12, with in this case even a single piston-cylinder unit may be used. The above-described sequence control may also be realized in such embodiments, for example in the initially described first exemplary embodiment of the invention.

The closure element 1 may also be supported by more or less than the three rods 9, 9', 9" shown.

Instead of a sequence control the L-motions may also be achieved by separate, appropriately controlled valves.

The third exemplary embodiment shown in FIGS. 18 through 24 differs from the above-described second exemplary embodiment essentially by the embodiment of the tilting actuators 25', 26'. The inner cavity 27 and the respective tilting actuators 25', 26' is here not limited over the entire circumference but only at one side by a wall 39 comprising an elastic and/or flexible material. For the rest, the inner cavity is limited by sections of the door body 10, thus by stiff walls. The wall 39 stretchable and/or flexible elastically over sections is connected in a sealing fashion to the door body 10, extending over a recess of the door body 10. In the exemplary embodiment a circumferential frame 40 serves for the sealing connection to the door body 10, with an elastic diaphragm of the wall 39 with its edge region being clamped circumferentially between the door body 10 and the frame 40. For this purpose, the frame 40 is screwed via screws 41 to the door body 10.

In order to improve the sealing between the door body 10 and the elastic diaphragm said diaphragm may be provided in the area of its circumferential edge with a bead-like enlargement, which is pressed against the surface of the door body 10 (the bead-like enlargement is shown in the figures in a non-compressed state so that it is shown penetrating into the door body 10.)

Other sealing connections between the diaphragm and the door body 10 are also possible, e.g., the elastic diaphragm may be vulcanized or adhered to the door body 10.

At the exterior surface of the elastic diaphragm, facing away from the inner cavity 27, a support plate is mounted, particularly vulcanized or adhered. Over the extension of the support plate 42 the elastic stretchability and the flexibility of the diaphragm is interrupted thereby and the wall 39 limiting the inner cavity 27 is therefore stiff overall in this area.

The wall 39 of the respective tilting actuator 25', 26', embodied at least over sections in an elastic and/or flexible fashion, is supported via the support plate 42 at the contact surface 37 of the respective support block 35, 36 of the fastening part 21.

In order to operate the respective tilting actuator 25', 26' compressed air is injected into the inner cavity 27. Here, its volume increases by the expansion of the elastic diaphragm, causing the wall 39 to be displaced in the direction towards the chamber wall 3.

The inner cavity 27 of the tilting actuator 26 is connected via a channel 43 with the cylinder space acting in the closing direction of the rod drive 12, allowing a sequence control to form. Even a separate channel is possible for filling in compressed air into the inner hollow cavity 27 of the tilting actuator 26.

Different modifications of this third exemplary embodiment are possible. For example, the wall 39 of the respective tilting actuator 25', 26, (at least over sections) elastically stretchable and/or flexible can also be supported directly at the chamber wall.

The support plate 42 may also be omitted so that the wall 39 is elastic and/or flexible over its entire extension.

Instead of an integration of the tilting actuators 25', 26' into the door body 10 the tilting actuators 25', 26' may also be integrated in the fastening part 21, with the (at least over sections) elastic and/or flexible wall 39 would then be supported on a contact surface 37 of the door body 10.

The wall 39 may also be embodied in an unstretchable and only (at least over sections) flexible manner.

Although a linear displacement of the rod 9 to adjust the closure element from its open position into its intermediate position is preferred, as is the case in the above-described exemplary embodiments, in all embodiments described for the adjustment of the closure element between an open and an intermediate position also a pivotal support of the rod at the door body and a rod drive pivoting the rod about its pivotal axis can also be possible.

The support of the door body 10 in a tilting fashion may also occur in a manner different from the described one, for example by the bearing blocks 23 directly being fastened to the chamber wall 3. The support plate 22 can then be omitted and the tilting actuators 25, 26 embodied as inflatable elements can be supported on the one side on the door body 10 and at the other side directly on the chamber wall 3.

A tilting actuator may also be provided, acting only in one rotary direction about the tilting axis 20, which acts against a spring-elastic element which, when the fill medium is evacuated from the tilting actuator, tilts back the door body 10.

Instead of compressed air, other pressurized gas, particularly nitrogen, may also be used.

LEGEND CONCERNING THE REFERENCE CHARACTERS 1 closure element
2 opening
3 chamber wall
4 vacuum chamber
5 seal
6 sealing surface
7 seat
8 connection part
9, 9', 9" rod
10 door body
11 longitudinal axis
12 rod drive
13 cylinder bore
14 piston
15 guiding rod
16 brace
17 anti-twist protection rod
18 anti-twist protection rod
19 axis
20 tilting axis
21 fastening part
22 support plate
23 bearing block
24 bore
25, 25' tilting actuator
26, 26' tilting actuator
27 cavity
28 connection
29 vacuum pump
30 bearing part
31 bearing part
32 bearing area
33 cover plate
34 ring
35 support block
36 support block
37 contact surface
38 contact surface
39 wall
40 frame
41 screw
42 support plate
43 channel

The invention claimed is:

1. A door for closing an opening (2) in a chamber wall (3) of a vacuum chamber (4) from atmosphere, comprising: a closure element (1), which is fastened to at least one rod (9, 9', 9") and which can be adjusted between an open position in which the closure element releases the opening (2), an intermediate position, in which the closure element covers the opening (2) but is spaced apart from a seat (7) surrounding the opening (2), and a closed position in which the closure element is pressed against the seat (7), a door body (10) that carries the at least one rod (9, 9', 9") and the closure element (1), and which for adjusting the closure element (1) between the intermediate position and the closed position can be tilted in reference to the chamber wall (3) about a tilting axis (20), and at least one tilting actuator (25, 25', 26, 26') which includes an inner cavity (27) into which compressed gas is introducible in order to tilt the door body (10) about the tilting axis (28), at least one wall (39) limiting the inner cavity (27) of the tilting actuator (25, 25', 26,26') is at least one of elastic or flexible fashion at least over a section of its extension and is supported on at least one of a contact surface (38) of the door body (10), or on a contact surface (37) of the chamber wall (3), or of a fastening part (21) held on the chamber wall (3) wherein first and second of said tilting actuator (25, 26) are respectively arranged on opposite sides of the tilting axis (20), of each of which the at least one wall (39) respectively limiting the inner cavity (27) is embodied at least one of elastically or flexibly over at least a section of its extension and is supported on at least one of the contact surface (38) of the door body (10) or on the contact surface (37) of the chamber wall (3) or of the fastening part (21) held at the chamber wall (3).

2. A door according to claim 1, wherein the inner cavity of the tilting actuator (25, 26) is limited entirely by the wall (39), which is at least one of elastic or flexible, which on one side is supported on the contact surface (38) of the door body (10) and on the other side on the contact surface (37) of the chamber wall (3) or the fastening part (21) held on the chamber wall (3).

3. A door according to claim 2, wherein the tilting actuator (25, 26) comprises an inflatable hose.

4. A door according to claim 3, wherein the tilting actuator (25, 26) comprised of the inflatable hose is arranged with its two ends in bores in the fastening part (21) or in the door body (10).

5. A door according to claim 4, wherein the fastening part (21) or the door body (10) in an area between the two bores, in which the ends of the inflatable hose that forms the tilting actuator (25, 26) are arranged, has a recess in an area in which a central section of the hose is supported at the contact surface (37) of the fastening part (21) and the contact surface (38) of the door body (10).

6. A door according to claim 1, wherein the wall (38) which is embodied at least one of elastically or flexibly at least over sections of its extension comprises at least one of an elastic or flexible diaphragm, which is connected tightly to a stiff section of the tilting actuator (25', 26') with the inner cavity (27) of the tilting actuator (25', 26') being located between the diaphragm and the stiff section of the tilting actuator (25', 26').

7. A door according to claim 6, wherein the stiff section of the tilting actuator (25', 26') is formed by the door body (10).

8. A door according to claim 6, wherein a support plate (42) is fastened to a surface of the diaphragm facing away from the inner cavity (27), which is supported on the contact surface (37, 38).

9. A door according to claim 1, wherein the door body (10) is articulated on the fastening part (21) to be fastened at the chamber wall (3) in a manner tiltable about the tilting axis (20).

10. A door according to claim 1, wherein the rod (9) or at least one of the rods (9, 9', 9") is guided in the door body (10) in an axially displaceable fashion.

11. A door according to claim 1, wherein the at least one rod (9, 9', 9") for adjusting the closure element (1) is displaceable in the direction of a longitudinal axis (11) thereof between the open position and the intermediate position by a rod drive (12).

12. A door according to claim 11, wherein the rod drive (12) comprises at least one piston (14) arranged in a cylinder bore (13) of the door body (10) to which the rod (9) or at least one of the rods (9, 9', 9") is connected.

13. A door according to claim 11, wherein the first and second tilting actuators are respectively arranged on opposite sides of the tilting axis in reference to the direction of the longitudinal axis of the rod.

14. A door according to claim 1, wherein the closure element (1) is arranged on an atmospheric side of the chamber wall (3).

15. A door according to claim 1, wherein the rod (9, 9', 9") is anti-twist protected in reference to the door body (10) against a rotation about a longitudinal axis (11) of the rod.

16. A door for closing an opening (2) in a chamber wall (3) of a vacuum chamber (4) from atmosphere, comprising: a closure element (1), which is fastened to at least one rod (9, 9', 9") and which can be adjusted between an open position in which the closure element releases the opening (2), an intermediate position, in which the closure element covers the opening (2) but is spaced apart from a seat (7) surrounding the opening (2), and a closed position in which the closure element is pressed against the seat (7), a door body (10) that carries the at least one rod (9, 9', 9") and the closure element (1), and which for adjusting the closure element (1) between the intermediate position and the closed position can be tilted in reference to the chamber wall (3) about a tilting axis (20), and at least one tilting actuator (25, 25', 26, 26') which includes an inner cavity (27) into which compressed gas is introducible in order to tilt the door body (10) about the tilting axis (28), at least one wall (39) limiting the inner cavity (27) of the tilting actuator (25, 25', 26,26') is at least one of elastic or flexible fashion at least over a section of its extension and is supported on at least one of a contact surface (38) of the door body (10), or on a contact surface (37) of the chamber wall (3), or of a fastening part (21) held on the chamber wall (3), wherein the inner cavity of the tilting actuator (25, 26) is limited entirely by the wall (39), which is at least one of elastic or flexible, which on one side is supported on the contact surface (38) of the door body (10) and on the other side on the contact surface (37) of the chamber wall (3) or the fastening part (21) held on the chamber wall (3), the tilting actuator (25, 26) comprises an inflatable hose and is arranged with its two ends in bores in the fastening part (21) or in the door body (10).

17. A door for closing an opening (2) in a chamber wall (3) of a vacuum chamber (4) from atmosphere, comprising: a closure element (1), which is fastened to at least one rod (9, 9', 9") and which can be adjusted between an open position in which the closure element releases the opening (2), an intermediate position, in which the closure element covers the opening (2) but is spaced apart from a seat (7) surrounding the opening (2), and a closed position in which the closure element is pressed against the seat (7), a door body (10) that carries the at least one rod (9, 9', 9") and the closure element (1), and which for adjusting the closure element (1) between the intermediate position and the closed position can be tilted in reference to the chamber wall (3) about a tilting axis (20), and at least one tilting actuator (25, 25', 26, 26') which includes an inner cavity (27) into which compressed gas is introducible in order to tilt the door body (10) about the tilting axis (28), at least one wall (39) limiting the inner cavity (27) of the tilting actuator (25, 25', 26,26') is at least one of elastic or flexible fashion at least over a section of its extension and is supported on at least one of a contact surface (38) of the door body (10), or on a contact surface (37) of the chamber wall (3), or of a fastening part (21) held on the chamber wall (3) wherein the wall (38) which is embodied at least one of elastically or flexibly at least over sections of its extension comprises at least one of an elastic or flexible diaphragm, which is connected tightly to a stiff section of the tilting actuator (25', 26') with the inner cavity (27) of the tilting actuator (25', 26') being located between the diaphragm and the stiff section of the tilting actuator (25', 26') and a support plate (42) is fastened to a surface of the diaphragm facing away from the inner cavity (27), which is supported on the contact surface (37, 38).

* * * * *